United States Patent [19]
Dunsmore et al.

[11] Patent Number: 5,937,220
[45] Date of Patent: *Aug. 10, 1999

[54] APPARATUS AND METHOD FOR SYNCHRONIZING FILM METERING

[75] Inventors: Clay Allen Dunsmore, Fairport; David Stanley Madziarz, Bergen; Joel Sherwood Lawther, Rochester, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/900,006

[22] Filed: Jul. 24, 1997

Related U.S. Application Data

[63] Continuation of application No. 08/462,091, Jun. 4, 1995, abandoned.

[51] Int. Cl.$^6$ .................................................. G03B 1/00
[52] U.S. Cl. ............................................ 396/395; 396/409
[58] Field of Search ............................ 354/173.11, 217, 354/218, 213, 215, 173.1; 396/387, 392, 395, 397, 404, 409, 389

[56] References Cited

U.S. PATENT DOCUMENTS

| | | | |
|---|---|---|---|
| 4,417,793 | 11/1983 | Oyokota et al. | 354/21 |
| 4,431,292 | 2/1984 | Takahashi | 354/173.11 |
| 4,440,481 | 4/1984 | Hoda et al. | 354/171 |
| 4,632,530 | 12/1986 | Iwata et al. | 354/173.11 |
| 4,908,641 | 3/1990 | Fairman | 354/275 |
| 4,914,462 | 4/1990 | Pagano | 354/213 |
| 4,996,549 | 2/1991 | Yamaguchi | 354/173.11 |
| 5,210,562 | 5/1993 | Miyazawa et al. | 354/400 |
| 5,313,236 | 5/1994 | Izukawa | 354/106 |
| 5,323,198 | 6/1994 | Tabata et al. | 354/173.1 |
| 5,345,286 | 9/1994 | Stiehler | 354/173.1 |
| 5,416,548 | 5/1995 | Kataoka | 354/275 |
| 5,452,055 | 9/1995 | Smart | 355/68 |
| 5,483,313 | 1/1996 | Nagao et al. | 354/106 |
| 5,493,355 | 2/1996 | Kazami | 354/106 |
| 5,504,546 | 4/1996 | Kazami et al. | 354/106 |
| 5,543,877 | 8/1996 | Takashi et al. | 354/173.1 |

*Primary Examiner*—Safet Metjahic
*Assistant Examiner*—Christopher E. Mahoney
*Attorney, Agent, or Firm*—Charles E. Snee, III

[57] ABSTRACT

A camera metering mechanism discriminates between 1) adjacent perforations in a set, which trigger said metering mechanism to interrupt the film advance, and 2) adjacent perforations between sets, which do not trigger the interruption. The mechanism uses a difference in spacing between the perforations, which alternates between a first distance within a set and a second longer distance between sets. The mechanism is triggered to interrupt film advance when the space between detected perforations is less than a predetermined distance. If the space exceeds the predetermined distance, then film advance continues until the next successive perforation. According to more specific features, the perforation detector initiates electrical transitions at the leading and trailing edges of the perforations, and film distances are a determined from the time difference between selected transitions.

14 Claims, 9 Drawing Sheets

APPARATUS AND METHOD FOR SYNCHRONIZING FILM METERING

CROSS REFERENCE TO RELATED APPLICATION

This application is a continuation of Ser No. 08/462,091 filed Jun. 4, 1995 and now abandoned.

FIELD OF INVENTION

The invention relates to photography, and more specifically to cameras including film metering mechanisms for sequentially advancing respective frames of photographic film into an exposure position.

BACKGROUND OF THE INVENTION

Photographic cameras typically include mechanisms for advancing film intermittently from a supply chamber through an exposure position into a take-up chamber. Film movement is metered to sequentially advance sections of the film, called frames, into the proper position for exposure. The mechanism then interrupts further movement of the film until an exposure is completed and the mechanism is operated again to advance the next successive frame into position.

Most photographic film includes perforations along one or both edges, and many cameras use the perforations for film metering. Thirty-five millimeter film formats (35 mm), for example, are perforated along both edges, defining a pitch of eight perforations per frame. It is common to provide thirty-five millimeter cameras with a metering gear that is rotated by engagement with the perforations. The gear drives a cam that controls the film advancing mechanism.

Other film formats have only one perforation per frame. Cameras adapted for this film often have a pawl that drops into the perforations, using the mechanical movement of the pawl to close a switch or control a mechanism that interrupts the film advance.

The present invention relates more directly to a film format that uses two perforations per frame spaced in-line along one edge of the film. Corresponding metering mechanisms include perforation detectors that use both perforations for controlling film movement. The first perforation anticipates the next successive frame, while the second perforation is used to control its location relative to the exposure position. The anticipation and metering perforations define a set of two perforations, and the pitch between adjacent sets is greater than the distance between perforations within a single set.

Automated cameras using the last-mentioned format may drive the film through a wind-up spool in the take-up chamber. The film is attached to the spool, and is advanced by rotating the spool, accumulating successive convolutions and thereby pulling the film across the exposure position. An electric motor may advance the film by rotating the spool, while the perforations are sensed and counted by an optical sensor. The sensor forms part of a metering mechanism that interrupts the motor drive after detecting the perforations.

Using a set of two perforations facilitates higher speeds in auto-winding film advancing systems. It has been found, however, according to the teaching of the present specification, that additional complications arise if operating errors corrupt the intended metering cycle. Power may be lost, the camera may be dropped or the system otherwise may suffer from unintended abuse, causing the camera mechanisms to lose track of the perforation sequence. Restarting the cycle out of the normal sequence will then improperly position all of the subsequent frames.

SUMMARY OF THE INVENTION

The present invention is directed to overcoming one or more of the problems set forth above. Briefly summarized, according to one aspect of the invention, a camera metering mechanism or system discriminates between 1) adjacent perforations in a set, which trigger said metering mechanism to interrupt the film advance, and 2) adjacent perforations between sets, which do not trigger the interruption. The mechanism uses a difference in spacing between the perforations, which alternates between a first distance within a set and a second longer distance between sets. The mechanism is triggered to interrupt film advance when the space between detected perforations is less than a predetermined distance. If the space exceeds the predetermined distance, then film advance continues until the next successive perforation. According to more specific features, the perforation detector initiates electrical transitions at the leading and trailing edges of the perforations, and film distances are a determined from the time difference between selected transitions.

According to other features of the invention, the metering mechanism has one or more fail-safe modes triggered when the time interval between successive detections or transitions exceeds a predetermined maximum.

An alternative embodiment of the invention includes a camera for use with photographic film having a leader preceding an image recording strip. The leader includes a first aperture, and the strip includes multiple second apertures marking image frames. The camera metering mechanism cycles the leader past the exposure position by detecting two of the first and/or second apertures before identifying an image frame. A more specific feature senses rotation of a film winding spool to detect a stalled film advance.

Still other embodiments of the invention are directed to methods for identifying the passage of a film leader past a camera exposure position. According to the method, a camera operates in a first cycle to identify passage of leader past said exposure position by detecting two of first and/or second apertures, and in a second cycle to identify the image recording frames from the second apertures. A further step detects non-rotation of the film winding spool to identify a stalled film advance.

A camera including a metering mechanism according to the present invention automatically resets the metering cycle and continues to position successive frames properly even after an unintended desynchronizing event. No knowledge of the event or corrective action is required of the camera operator.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
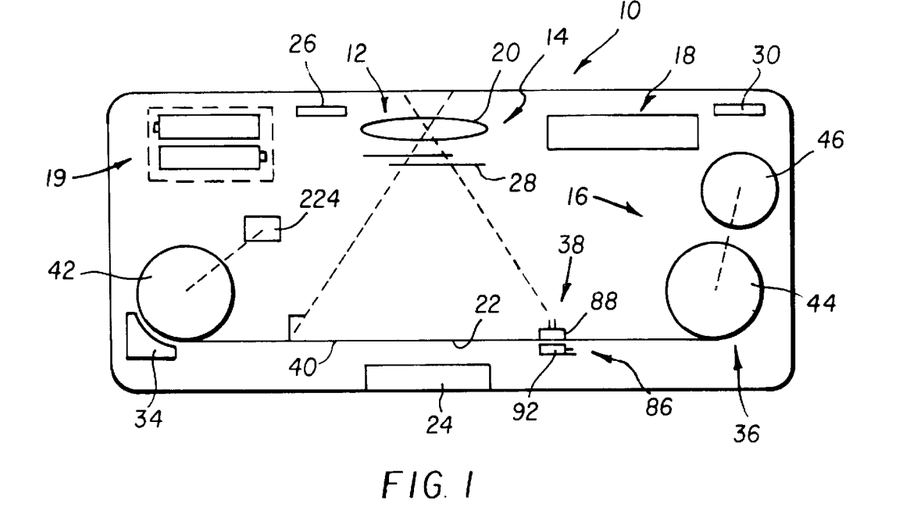
FIG. 1 is a schematic view of a preferred embodiment of the invention depicting a camera including autowinding and metering mechanisms for advancing successive frames of film into a proper exposure position.
Figure 2:
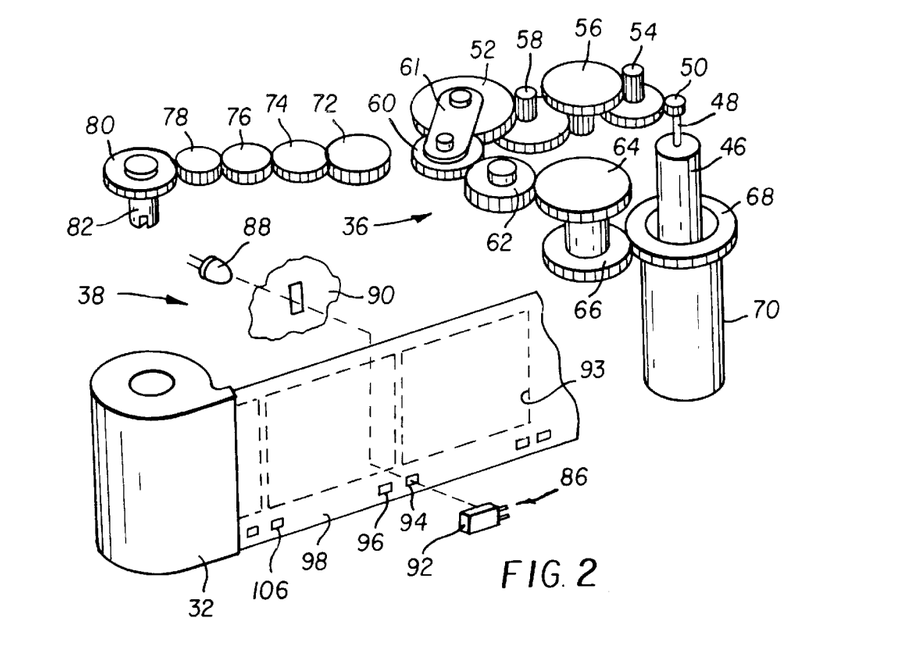
FIG. 2 is a perspective view showing more detail of the autowinding mechanism of FIG. 1.
Figure 3:
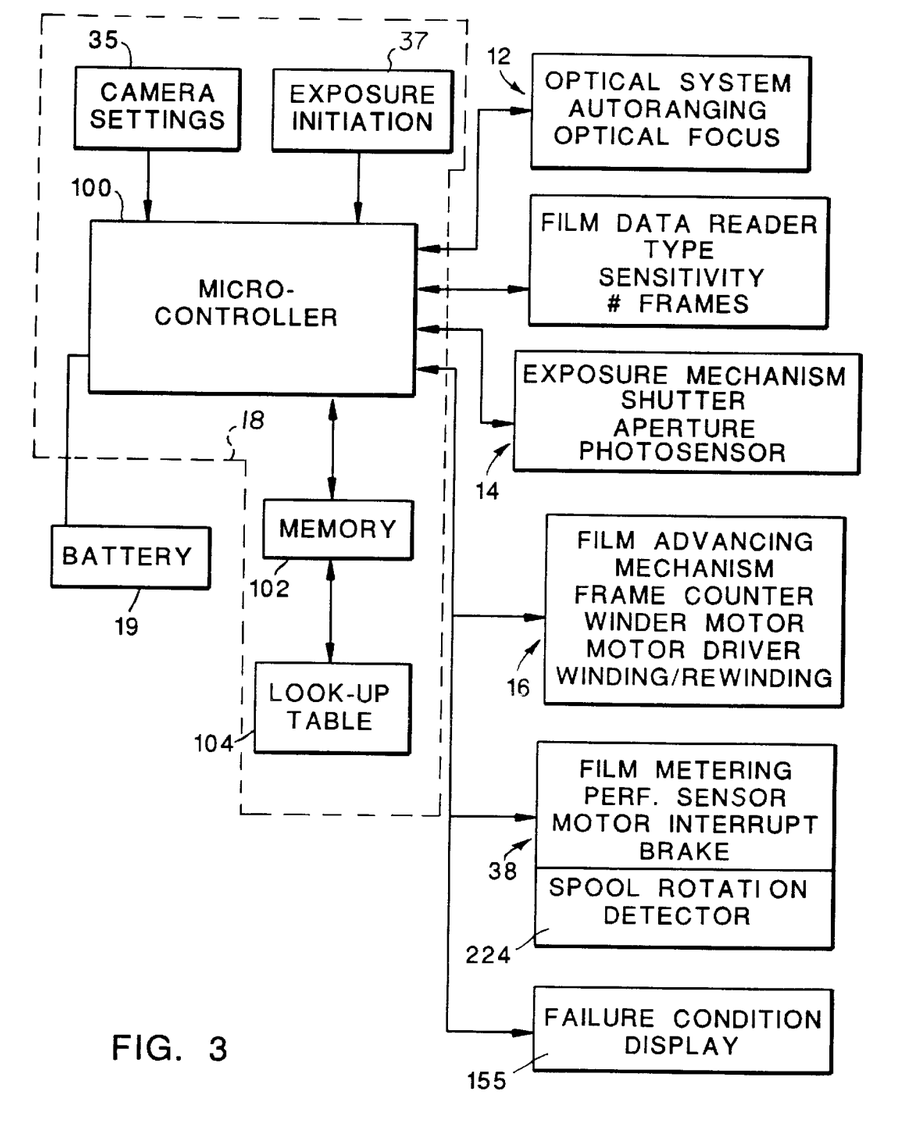
FIG. 3 is a schematic view of a control mechanism of the FIG. 1 camera for controlling various camera functions including film winding and metering.

Referring now to a preferred embodiment of the invention, and beginning with FIGS. 1–3, a camera 10 is depicted including an optical system 12, exposure mechanism 14, film advancing mechanism 16 and control 18. The system, mechanisms and control are powered by an electrical source depicted as one or more batteries 19.

Optical system 12 is a conventional design, available commercially, and includes one or more optical elements 20 for focusing an image of a photographic scene onto a plane in exposure position 22. The camera is pointed at the intended scene with the aid of viewfinder 24. An autoranging device 26 then adjusts the optical elements 20, properly focusing the image onto the exposure plane in position 22.

Exposure mechanism 14 also is a commercially available design including a combined shutter and aperture 28 and a photosensor 30. The photosensor 30 provides information about scene light to control 18, which uses the information to adjust the shutter speed and aperture size for a proper exposure. Other pertinent information is read from film cartridge 32 (FIG. 2), and provided to control 18, by a data or bar code reader 34 (FIG. 1). Film speed or sensitivity, for example, is read from the cartridge and used by the control 18 as one of the inputs for determining proper exposure settings. Other film and camera settings are input manually through appropriate features depicted at 35 in FIG. 3. Exposure initiation is completed manually through appropriate features depicted at 37 in FIG. 3.

Film advancing mechanism 16 includes a film transporting subsystem 36 (FIG. 2) and a film metering subsystem 38. The subsystems work together to advance the film 40 intermittently, one frame after another, from a supply chamber 42 (FIG. 1) through the exposure position 22 and into a take-up chamber 44.

The transporting subsystem 36 includes an electric motor 46 having an output shaft 48 and pinion 50 coupled to a sun gear 52 through a series of reduction gears 54, 56, and 58. The reduction gears reduce the drive speed of the motor 46 while increasing its torque. Sun gear 52, in turn, is coupled to a planetary gear 60 that is mounted on lever arm 61 for pivotal movement between first and second positions. The first position, shown in FIG. 2, winds the film into take-up chamber 44, while the second position rewinds the film into the supply chamber 42. In the winding position of the planetary gear 60, it engages a series of intermediate gears 62, 64, 66 and 68 that rotate a spool 70 in the take-up chamber 44. Film 40 is attached to the spool 70, so the film is wound onto the spool and accumulated there when the motor 46 is operated with planetary gear 60 in the winding position. When the planetary gear is moved to the rewinding position, it engages a second series of gears in a train 72, 74, 76, 78, and 80, that rewind the film back into the supply chamber 42. A fork 82 extending from gear 80 is keyed to a spool (not shown) in cartridge 32, so operation of the motor 46 through the rewinding gear train winds the film onto the cartridge spool. Motor 46 thus is driven in a forward direction for both winding or advancing the film from the cartridge and for rewinding or retracting the film into the cartridge.

The metering subsystem 38 comprises a single perforation sensor 86 acting through control 18 for interrupting power to motor 46 and reversing the power to brake the motor. Motor 46 is a DC motor, so power applied in the reversing direction acts to brake forward rotation of the motor until it stops. Reverse power is applied briefly, and then the motor terminals are shorted, to stop the motor without reversing its direction of rotation. Other electrical or mechanical braking methods might include a simple open circuit to the motor, shorting the motor terminals, or reversing the motor current either once or intermittently as a function of the measured velocity.

The perforation sensor 86 includes a source of illumination 88 positioned in-line with a slot 90 and photosensor 92. Preferably the illumination source 88 is a light emitting diode (LED) that radiates in wavelengths at which film 40 is relatively insensitive. In any event, slot 90 and its surrounding camera structure limit any exposure of the film to a small strip beyond the outside edges of the image frames 93. Film 40 includes two perforations 94 and 96 along one edge 98 of the film in a predetermined position relative to each intended exposure frame. The illumination source 88 is aligned with the film edge 98. When the film perforations are advanced into a position adjacent slot 90, light from the source 88 passes through the perforations 94 and 96 and onto the photosensor 92. The photosensor produces an electric signal proportional to the sensed illumination, and this signal is used by control 18 to meter film movement, successively positioning each successive frame in the exposure position.

Of course other marks, such as density gradients, could be provided on the film for identifying the intended position of the exposure frames. Similarly, other types of sensors could be provided for sensing the frame markers, including sensors that employ reflected or transmitted energy. It will be apparent from the following description, however, that it is preferable the sensors are sufficiently discriminating to sense leading and trailing edges of the frame markers, and most such sensors will be non-contacting, electronic sensors.

Control 18 includes a micro-controller 100 (FIG. 3) and memory 102, including a look-up table 104, for receiving inputs from the various camera mechanisms, including those described above, and for controlling their operation according to the inputs and predetermined instructions. Control 18 also determines and stores changing information such as the date and time and the number of film frames previously exposed.

Referring now to FIGS. 4–7, further details are depicted in accordance with a preferred embodiment of the invention. Briefly summarized, the spacing between adjacent perforations is used to check proper synchronism of the film metering mechanism, and to resynchronize the mechanism automatically when synchronization is lost through some unintended event.

Figure 4:
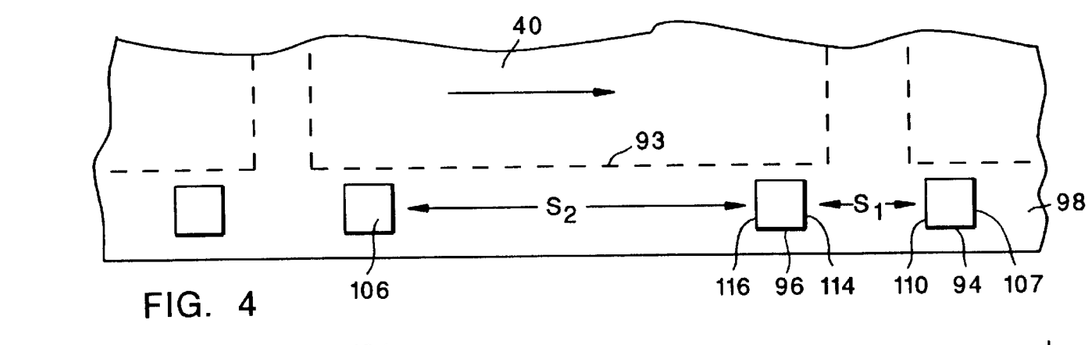
FIG. 4 is a plan view of a film strip for use in the camera of FIG. 1, illustrating perforations in the film used by the metering mechanism.

FIG. 4 represents a section of film 40 depicting a pair of perforations 94 and 96 separated by a distance $S_1$ and associated with each respective exposure frame 93. Visually, it might appear that perforations 96 and 106 are the perforations most closely associated with the frame 93, and, in other contexts, that might be the case. For the purposes of this description, however, the perforations 94 and 96 are referred to as a set associated with the following frame 93, while the distance $S_2$ between perforations 96 and 106 is the inter-set spacing.

As depicted in FIG. 4, the film has multiple perforations arranged in-line along edge 98. Each frame 93 has two perforations 94 and 96 in a predetermined position relative to the frame. Perforations in the same set are separated by a first distance $S_1$, and each set is separated from the next adjacent set by a second distance $S_2$ greater than the first distance $S_1$. Stated differently, the perforations define distances between adjacent perforations that alternate between a first distance $S_1$ defining sets of two perforations, and a second distance $S_2$ longer than the first distance, separating the respective sets.

Although both perforations 94 and 96 are metering perforations, perforation 94 also is referred to as an anticipation perforation, because it is used to anticipate the arrival of metering perforation 96 as frame 93 approaches the proper position for an exposure.

Figures 5, 6, 7:
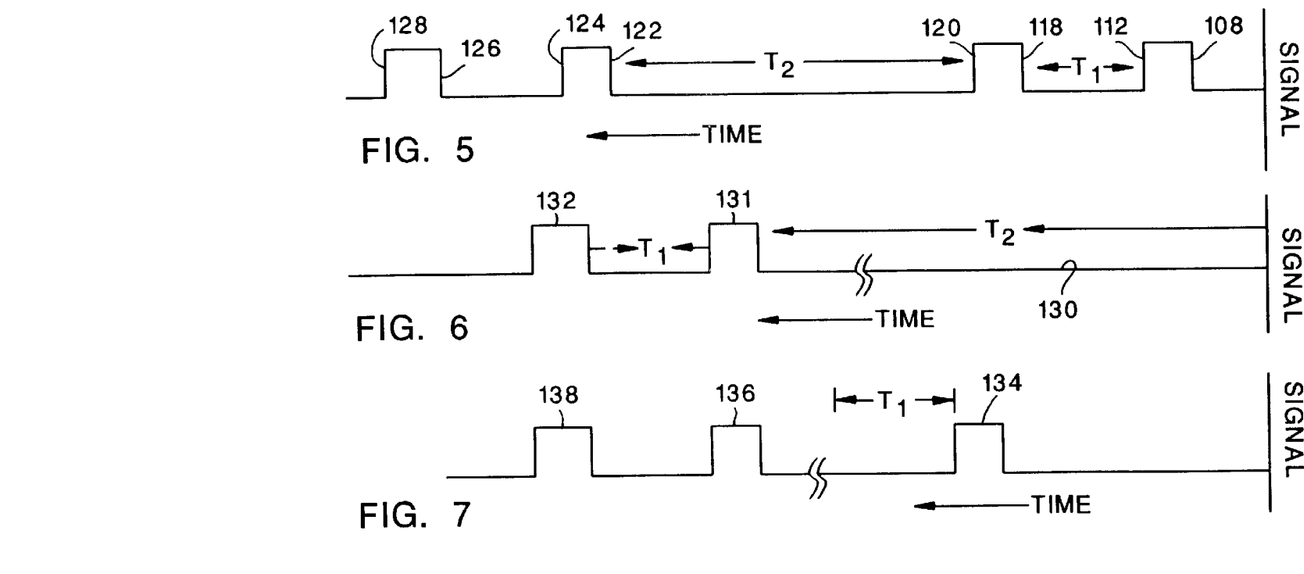
FIGS. 5–7 are schematic views representing electrical signals generated by the metering mechanism.

Movement of the film 40 relative to fixed sensor 86 generates a series of electrical signals depicted in FIG. 5. When the leading edge 107 of perforation 94 moves into alignment between light source 88 and photosensor 92, light passes through the perforation, striking the sensor and generating an electrical transition depicted at 108. This signal continues until the trailing edge 110 of perforation 94 moves beyond the photosensor 92, at which point the signal returns at 112 to its original value. The cycle is repeated at the leading and trailing edges, 114 and 116, of perforation 96, producing a similar signal starting at 118 and ending at 120. After the film is exposed, the film is advanced again and another similar set of signals is generated for the next set of two perforations, as depicted at 122, 124, 126 and 128. Of course appropriate filters and signal processing can be used to sharpen the transitions, and to provide a signal that is an appropriate digital input for control 18.

The signals generated by the perforation detector 86 define time intervals $T_1$ and $T_2$ that correspond to the above-mentioned distances $S_1$ and $S_2$. The film metering subsystem uses these time intervals to distinguish or discriminate between adjacent perforations that are in a single set, e.g. 94 and 96, compared to adjacent perforations that are in adjacent sets, e.g. 96 and 106.

FIG. 6 depicts film metering that is properly synchronized. When film is advanced to the next successive exposure frame at time 130, the metering subsystem looks for electrical transitions 131 and 132 representing the next two perforations. The perforations are in the same set, determined by the time interval $T_1$, which is shorter than a predetermined reference interval. Therefor, the subsystem interrupts the film advance with the frame in the proper exposure position. FIG. 7 depicts film metering that starts improperly synchronized. The time interval between electrical transitions 134 and 136 exceeds the predetermined reference, in this case $T_1$. The subsystem then resynchronizes by continuing film advance until it detects electrical transitions 136 and 138 within the predetermined reference.

In this case it is the second and third perforations that meet the required criteria of two perforations in the same set, and the subsystem interrupts the advance after the third perforation as described above.

Figure 8:
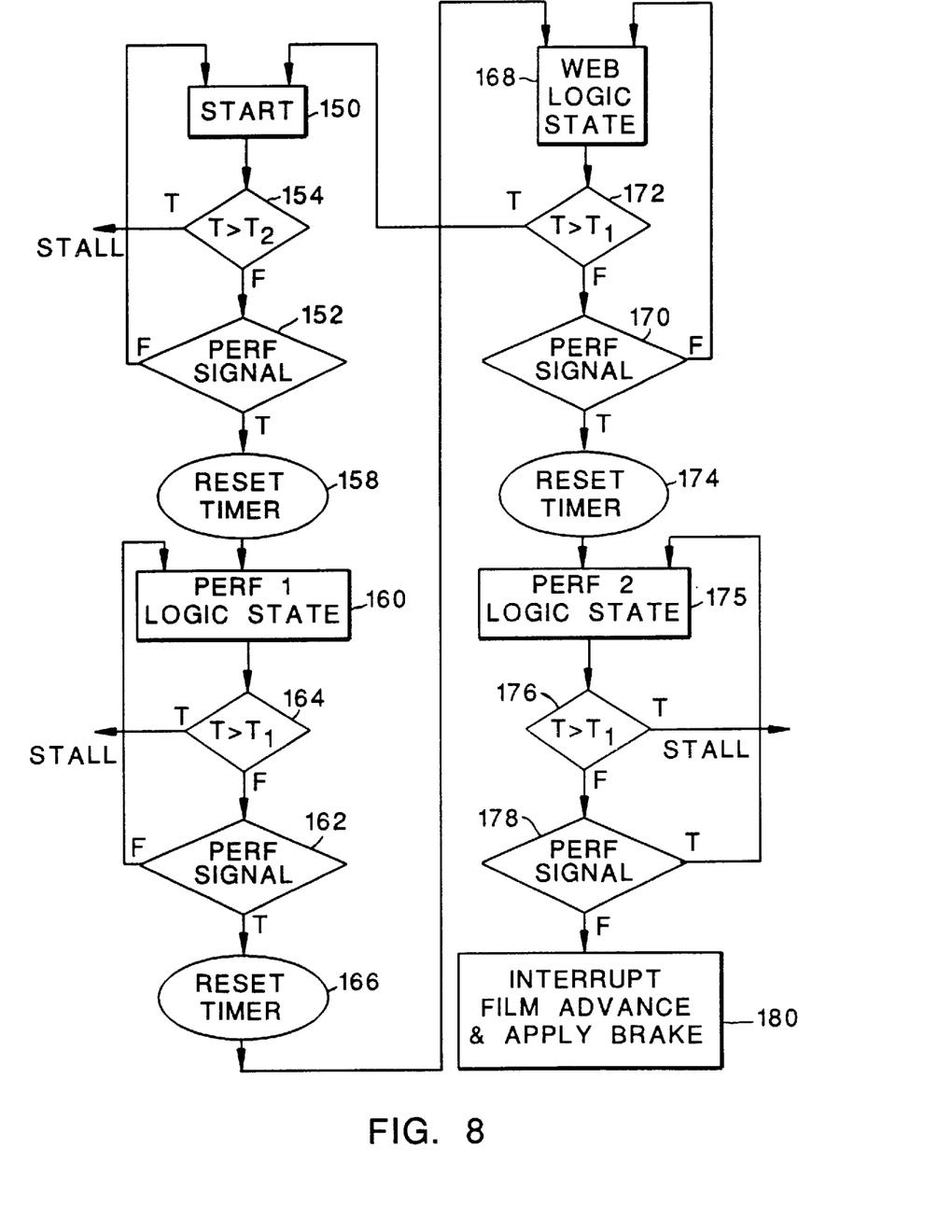
FIG. 8 is a flow diagram depicting the operation of the FIG. 1 camera according to the preferred embodiment.

A flow diagram representing the preferred embodiment is depicted in FIG. 8. Starting at step 150, the metering subsystem looks for a leading edge of a perforation signal, step 152. If no perforation signal is detected before timing out at step 154, the subsystem goes into a stall or fail-safe mode, provides a failure condition display 155 (FIG. 3), and discontinues further film advance. If, on the other hand, a perforation signal is detected, step 152, a timer is reset, step 158, and the subsystem assumes a PERF 1 logic state, step 160. The subsystem then looks for the perforation signal to stop at a trailing edge at step 162. If the perforation signal does not stop within a time period $T_1$, step 164, the subsystem goes into the stall or fail safe mode as described above. In this preferred embodiment the interval $T_1$ is selected to be the same as the interval between perforations in a single set. Of course other intervals could be selected. Absent a stalled condition, the perforation signal will stop, the timer is reset, step 166, and the subsystem assumes a WEB logic state, step 168. Next, the subsystem looks for a leading edge of a second perforation signal, step 170. If the time interval is greater than $T_1$, however, step 172, the subsystem resynchronizes by returning to step 150. Assuming a perforation signal is detected within the time interval $T_1$, the subsystem proceeds to step 174, resets the timer, and assumes a PERF 2 logic state 175. Absent a stall condition at step 176, the end of the second perforation signal is detected at its trailing edge at step 178, and the film advance is interrupted at step 180.

In summary, it is step 172 that determines if the subsystem proceeds through steps 170 to 180 to interrupt the film advance after detecting two perforations, or if the subsystem is reset so it will look for second and third perforations before interrupting the film advance.

Figure 9:
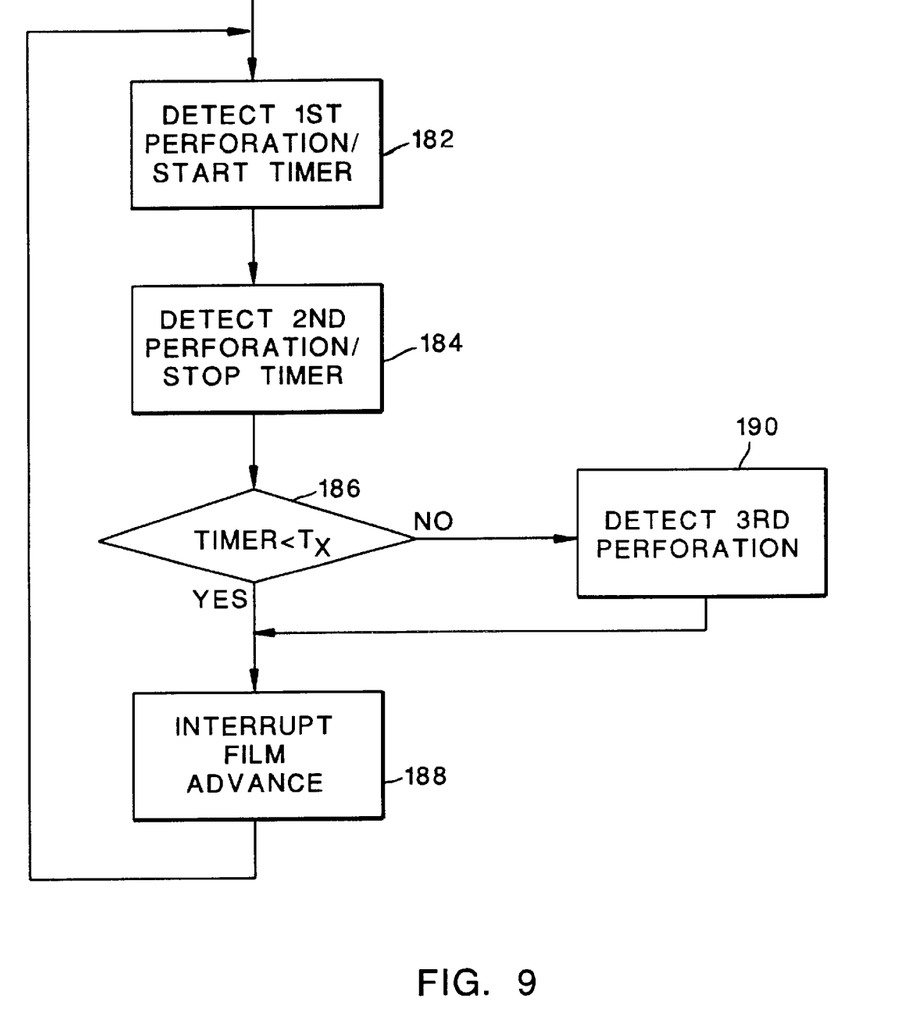
FIG. 9 is a flow diagram depicting the operation of the FIG. 1 camera according to a first alternative embodiment.

FIG. 9 depicts an alternative and simplified embodiment of the invention. If first and second perforations are detected within a predetermined reference interval $T_x$, , steps 182, 184 and 186, film advance is interrupted, step 188, after only two perforations are detected. Otherwise, film advance is continued, step 190, until a third perforation is detected.

Figure 10:
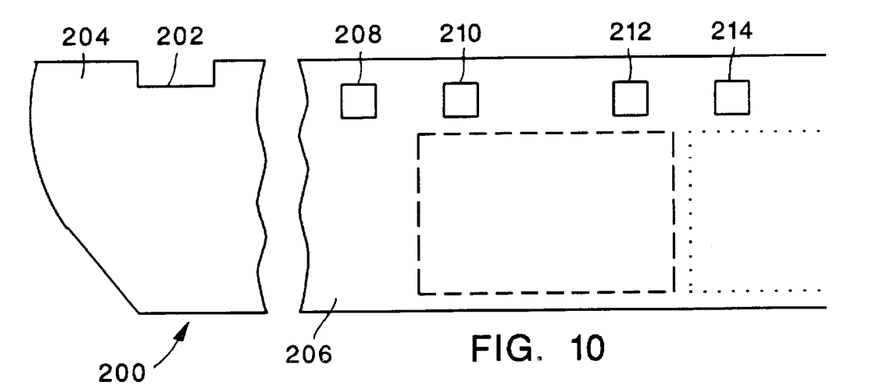
FIGS. 10–12 are schematic diagrams of a film leader preceding exposure frames in a film strip described in connection with a second alternative embodiment.
Figure 11:
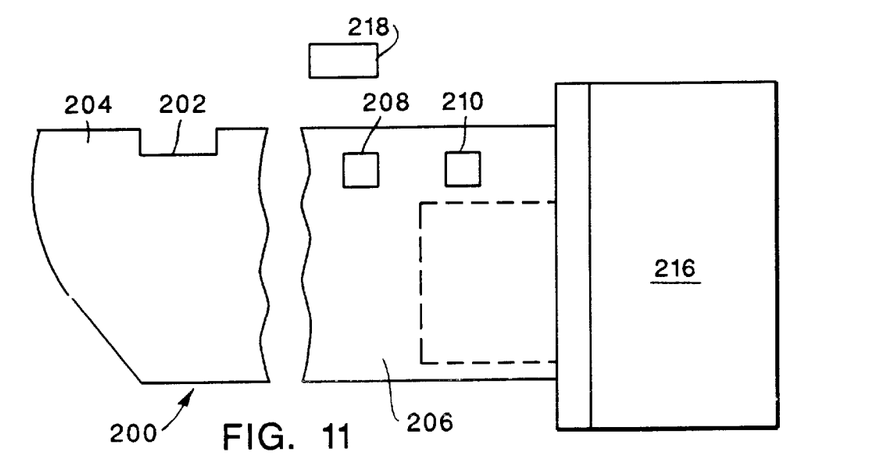

FIGS. 10–15 disclose a second alternative embodiment of the invention. The film 200 is similar to the film 40 in the preferred embodiment, except one edge of the film is notched at 202, identifying a leader 204 preceding the image recording portion 206 of the film. FIG. 10 depicts the notch 202 in the leader and two sets of perforations 208/210 and 212/214 in the image recording section.

Figure 12:
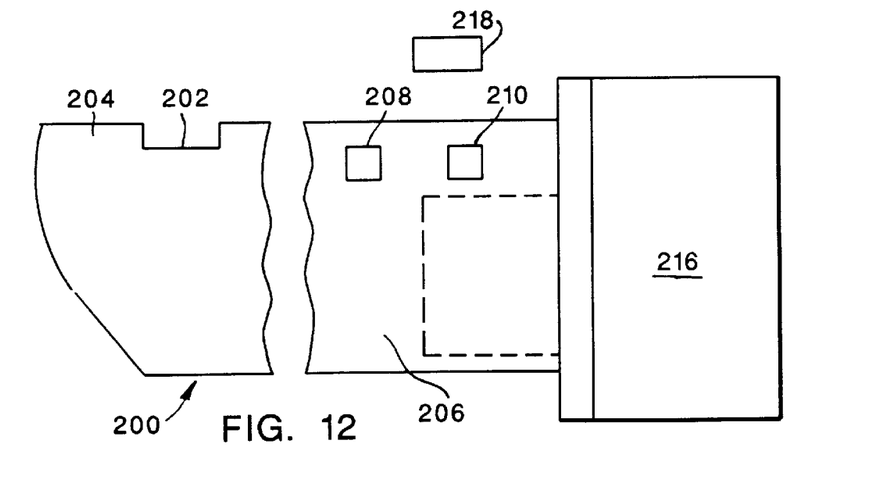

In this second alternative embodiment, the film metering subsystem corrects for failure to acquire proper synchronism when film is first ejected from a film cartridge 216, (see e.g. U.S. Pat. No. 5,231,438, the disclosure of which is incorporated by reference) particularly in prewound cameras. It is important at this early point to make sure the leader 204 is advanced beyond exposure position 22 before metering subsystem 38 operates according to the preferred embodiment of FIG. 8, to look for the first image frame. A metering subsystem 218 starts in a first mode that looks for two apertures and then continues in a second mode according to the preferred embodiment of FIG. 8. In the first mode the two apertures might include the notch 202 and one perforation 208, or, if the notch is not detected, the two apertures might include the first and second apertures 208 and 210 (FIG. 12). In either event, the leader will pass the detector 218 before proceeding to the second or regular mode.

Figure 13:
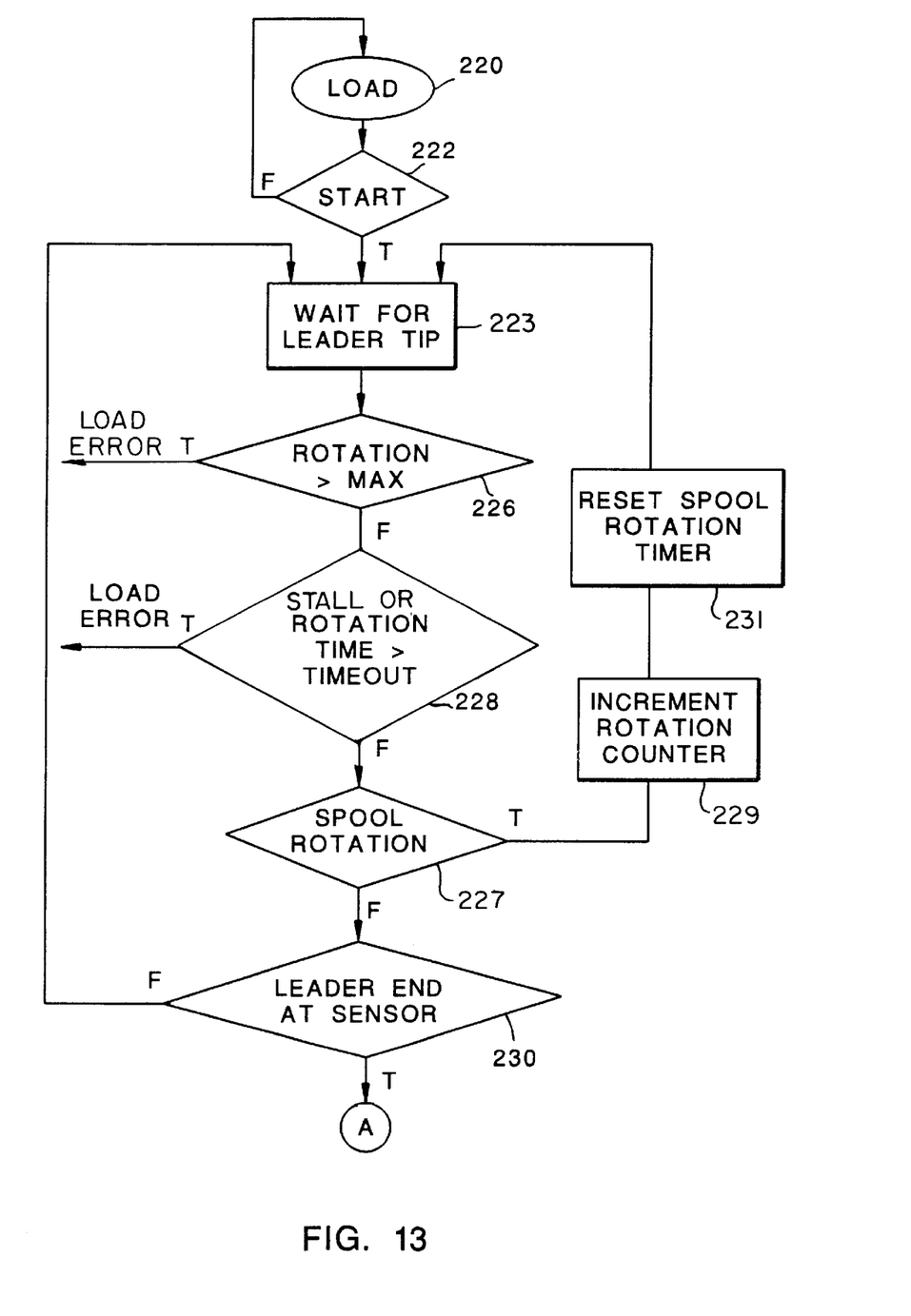
FIGS. 13–15 are sequential flow diagrams of a second alternative embodiment of the invention for feeding a film leader through the exposure position prior to detecting the exposure frames according to the preferred embodiment.
Figure 14:
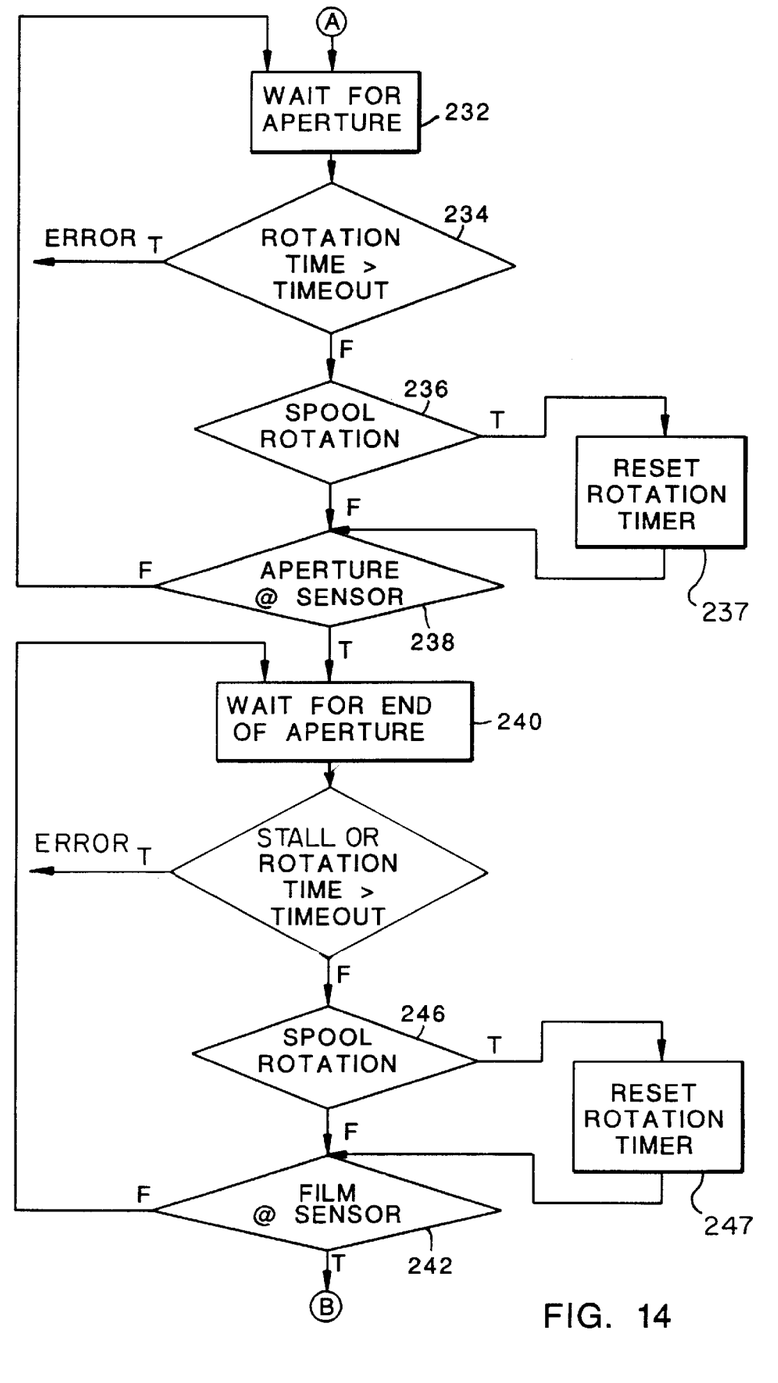
Figure 15:
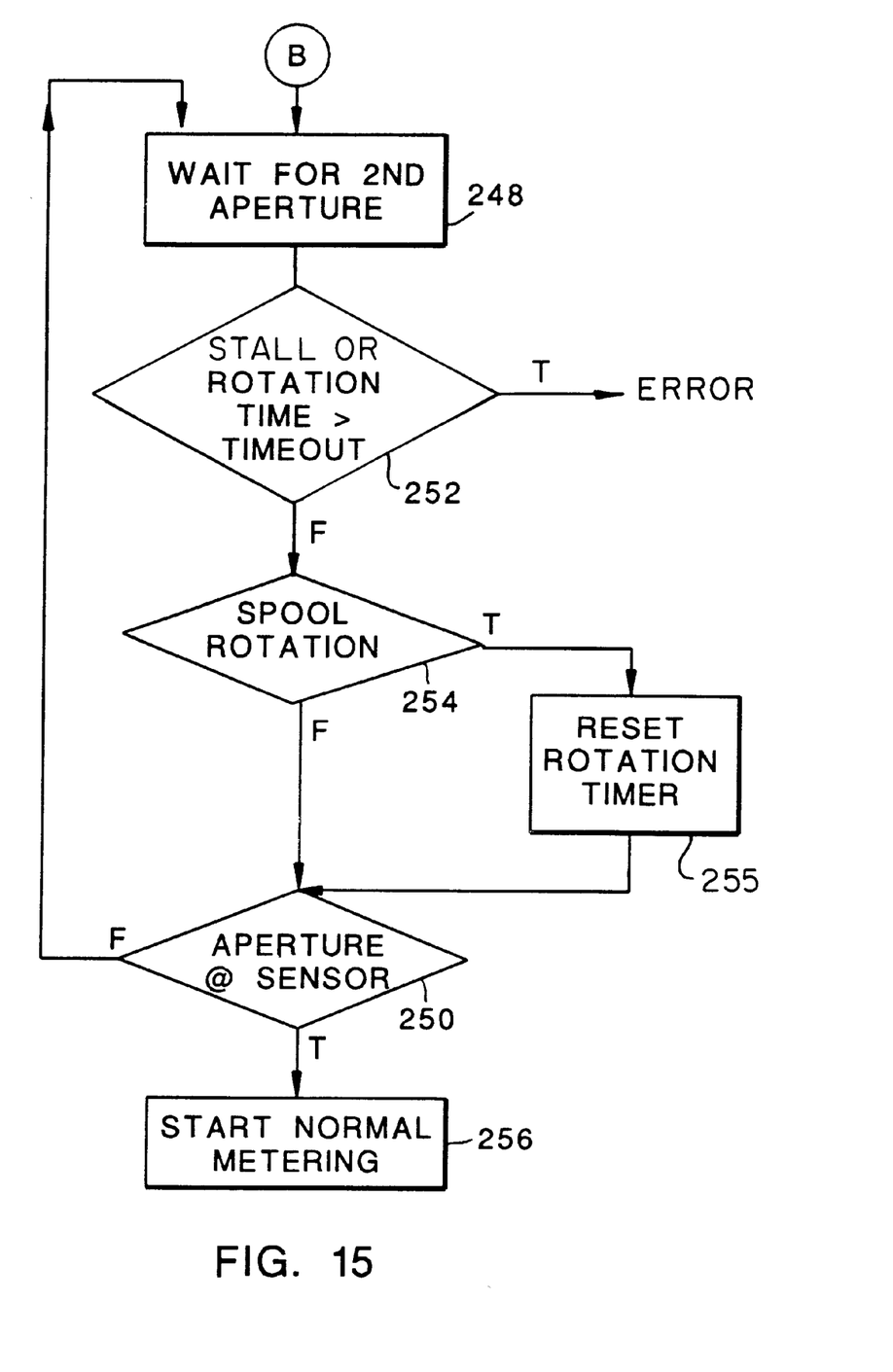

FIGS. 13–15 are sections of a single flow diagram representing the method steps of the second alternative embodiment. Starting at steps 220 and 222, the film is loaded and the metering cycle started. Metering subsystem 218 includes a sensor which a tip of leader 204 at step 223 looks for while a rotation sensor 224 (FIG. 1), monitors spool rotation for both too many rotations, step 226, and a stalled condition or rotation time out, step 228. Completion of a spool rotation, as sensed by sensor 224 is monitored at step 227; and following each rotation a rotation counter is incremented at step 229 and a rotation timer is reset at step 231. Assuming proper loading and operation, the tip of leader 204 reaches the subsystem 218, at step 230. As shown in FIG. 14, the sensor in subsystem 218 then looks for an aperture (202 or 208), notch or perforation, while again checking for a stalled condition, steps 232, 234, 236 and 237. No check is made for too many rotations in step 226. After detecting the aperture at step 238, represented electrically as a leading edge transition, the sensor in subsystem 218 looks for the end of the aperture and a trailing edge transition, steps 240 and 242. Error conditions are checked at 244, 246 and 247 and 246. As shown in FIG. 15, the sensor in subsystem 218 then looks for the second aperture (208 or 210), step 248 and 250, checking for error conditions at steps 252, 254 and 255. After the second aperture is detected, it is certain the film leader has passed the sensor subsytem 218, and the metering mechanism proceeds at step 256 with film feeding or prewinding according to the preferred embodiment of FIG. 8.

It should now be apparent that the invention provides apparatus and methods for synchronizing and resynchronizing film metering to correct automatically for many conditions that otherwise would be failure modes. The corrections occur automatically and do not require operator knowledge or intervention.

While the invention is described in connection with a preferred and alternative embodiment, other modifications and applications will occur to those skilled in the art. The claims should be interpreted to fairly cover all such modifications and applications within the true spirit and scope of the invention.

We claim:

1. A camera for use with photographic film having multiple in-line frame markers, the markers defining for each frame of the film a respective set of two markers, the markers being separated by a first distance within each set and the sets being separated by a second distance greater than the first distance, said camera comprising:

a metering system for intermittently advancing successive frames of the film into an exposure position, said metering system including:

a single sensor for detecting the markers as said metering system advances the markers past said single sensor and for producing signals; and timing means operatively connected to a control means;

said control means responsive to the timing of the signals for, after exposure of a frame of the film, causing said metering system to continuously advance the film and then interrupt continuous advancing of the film to position a next frame for exposure, interruption of said continuous advancing between successive frames occurring after said single sensor has detected either two successive signals separated by a time less than a first reference time interval T1, or three successive signals, a first two of the three successive signals being separated by a time greater than T1 and a last two of the three successive signals being separated by time less than T1.

2. A camera according to claim 1, wherein said metering system has a fail-safe condition for terminating continuous advancing of the film, said fail-safe condition being triggered when a time interval between successive detections of said markers exceeds a predetermined time interval T2.

3. A camera according to claim 1, wherein the frame markers are perforations in the film and said single sensor is a perforation detector.

4. A camera according to claim 3, wherein said signals include electrical transitions at leading and trailing edges of the film perforations, and the times are measured between the trailing edge transitions and next successive leading edge transitions.

5. A camera according to claim 4, wherein said metering system has a fail-safe condition for terminating advancing of the film, said fail-safe condition being triggered when a respective leading edge transition is followed by more than a predetermined time interval before a next respective trailing edge transition.

6. A camera according to claim 1, wherein the film has a leader with a first aperture before the frame markers; and before locating a frame at said exposure position, said metering system advances the film until said control means determines that the leader has passed said exposure position by detecting either (a) said signals corresponding to said first aperture and a first marker in a first set of said markers or (b) said signals corresponding to two markers in the first set of markers.

7. A camera according to claim 6, wherein said camera includes a rotatable spool and a spool rotating mechanism for winding the film onto the spool to advance the film relative to said exposure position, and said metering system includes a rotation detector for identifying a stalled film advance.

8. A method of operating a camera including a metering system for intermittently advancing successive frames of a filmstrip into an exposure position; said filmstrip including multiple in-line frame markers, said markers defining for each frame of the filmstrip a respective set of two markers, said markers being separated by a first distance within each set and said sets being separated by a second distance greater than said first distance; said metering system including a single sensor for detecting said markers, comprising steps of:

a.) after exposure of a frame, actuating said metering system and continuously advancing said filmstrip to position a next frame for exposure;

b.) during said continuously advancing, detecting passage of a trailing edge of a first one of said markers;

c.) during said continuously advancing, detecting passage of a leading edge of a next, second one of said markers;

d.) determining whether a first time interval between said trailing edge of said first marker and said leading edge of said second marker exceeds a first, predetermined interval; and e.1.) if said first time interval is less than said first, predetermined interval, during said continuously advancing detecting passage of a trailing edge of said next, second marker and then stopping said filmstrip; or e.2.) if said first time interval is greater than said first, predetermined interval, during said continuously advancing detecting passage of a trailing edge of a next, third one of said markers and then stoppgn said filmstrip.

9. A method according to claim 8, further comprising a step of:

prior to step b.), detecting passage of a leading edge of said first one of said markers;

determining whether a second time interval between said leading and trailing edges of said first one of said markers exceeds a second, predetermined interval; and if said second time interval exceeds said second, predetermined interval, stopping said filmstrip.

10. A method according to claim 8, further comprising a step of:

prior to step b.), determining whether a second time interval, after said actuating and during said advancing, exceeds a second, predetermined interval; and if said second time interval exceeds said second, predetermined interval, stopping said filmstrip.

11. A method according to claim 8, further comprising a step of:

prior to step e.1), determining whether a second time interval between said leading edge of said next, second marker and a trailing edge of said next, second marker exceeds a second, predetermined interval; and if said second time interval exceeds said second, predetermined interval, stopping said filmstrip.

12. A method according to claim 8, wherein the filmstrip has a leader defining an aperture preceding the in-line frame markers, further comprising steps of:

operating in a first cycle to identify passage of said leader past said exposure position by detecting (a) said aperture and a marker in a first set of said markers or (b) two markers in a first set of said markers;

operating in a second cycle after said first cycle to identify said image recording frames from said markers.

13. A method according to claim 12, wherein said second cycle uses a time interval between successive detections of said markers for identifying the image frames.

14. A method according to claim 12, wherein said camera includes a rotatable spool and a spool rotating mechanism for winding the film onto the spool to advance the film relative to the exposure position, further comprising a step of detecting non-rotation of said spool for identifying a stalled film advance.

* * * * *